UNITED STATES PATENT OFFICE.

EUGÉNE CAREZ, OF BRUSSELS, BELGIUM.

PROCESS OF MAKING AMMONIUM NITRATE.

SPECIFICATION forming part of Letters Patent No. 435,280, dated August 26, 1890.

Application filed April 10, 1889. Serial No. 306,711. (No specimens.) Patented in Belgium August 17, 1888, No. 82,930; in Austria-Hungary August 30, 1888, and February 23, 1889, No. 35,935 and No. 57,999; in Germany December 21, 1888, No. 48,278; in France March 11, 1889, No. 196,619; in England March 12, 1889, No. 4,316; in Sweden March 21, 1889, No. 2,207; in Norway March 21, 1889, No. 1,290, and in Spain April 1, 1889, No. 9,432.

*To all whom it may concern:*

Be it known that I, EUGÉNE CAREZ, a subject of the King of Belgium, residing at Brussels, in the Kingdom of Belgium, have invented certain new and useful Improvements in the Manufacture of Ammonium Nitrate, (for which I have obtained Letters Patent in Belgium, dated August 17, 1888, No. 82,930; in Austria-Hungary, dated August 30, 1888, and February 23, 1889, No. 35,935, and No. 57,999; in Germany, dated December 21, 1888, No. 48,278; in France, dated March 11, 1889, No. 196,619; in Great Britain, dated March 12, 1889, No. 4,316; in Sweden, dated March 21, 1889, No. 2,207; in Norway, dated March 21, 1889, No. 1,290, and in Spain, dated April 1, 1889, No. 9,432,) of which the following is a specification.

The present invention consists in the application of a new process for the industrial manufacture of ammonium nitrate without the use of nitric acid or of liquid ammonia, the industrial employment of which is not economical, and is at all times very dangerous, or at least is always obnoxious to the workmen charged with the manipulation of these products.

The industrial preparation of ammonium nitrate, according to this new process worked out by me, requires three operative phases or three consecutive operations, as follows: Natural barium sulphate, otherwise the "barytes" or "heavy spar," is transformed into sulphide by calcining this product in the absence of air with a mixture of charcoal and resin-oil. The crude barium sulphide is mixed with sulphur in powder and water, and the mixture boiled. The polysulphide solution which results is then treated with sodium nitrate. After evaporation and crystallization, the barium nitrate is separated, then the barium nitrate is caused to react upon ammonium sulphate. The two salts produce by double decomposition barium sulphate, (which serves indefinitely for the preparation of the sulphide,) and of ammonium nitrate which is then crystallized. The salt thus obtained is pure, its preparation does not require the employment of liquid corrosive acids or the disengagement of odors or other emanations obnoxious to the workmen.

I claim—

The process of manufacturing ammonium nitrate, consisting in calcining barium sulphate out of contact with air with a mixture of charcoal and resin-oil, (or other hydrocarbon,) and boiling the product of the reaction with sulphur and water to produce polysulphide and transforming this into barium nitrate by means of sodium nitrate, and then crystallizing and decomposing with ammonium sulphate in order to produce on the one hand ammonium nitrate and on the other to recover the barium sulphate.

EUGÉNE CAREZ.

Witnesses:
AUG. TOERISSEN,
C. MAILLIEU.